(12) United States Patent
Fujiwara et al.

(10) Patent No.: US 6,224,767 B1
(45) Date of Patent: May 1, 2001

(54) FLUID SEPARATION ELEMENT ASSEMBLY

(75) Inventors: Koji Fujiwara, Iyo-gun; Hiroyuki Ikada, Otsu; Hisaaki Fujino, Hikone, all of (JP)

(73) Assignee: Toray Industries Inc. (JP)

( * ) Notice: Subject to any disclaimer, the term of this patent is extended or adjusted under 35 U.S.C. 154(b) by 0 days.

(21) Appl. No.: 09/264,746

(22) Filed: Mar. 9, 1999

(30) Foreign Application Priority Data

Mar. 20, 1998 (JP) .................................................. 10-092565

(51) Int. Cl.[7] .......................... B01D 63/10; B01D 63/12; B01D 63/14
(52) U.S. Cl. ................ 210/323.1; 210/232; 210/321.77; 210/321.86; 210/322; 210/450; 210/493.1; 210/493.4; 210/497.1
(58) Field of Search ............................... 210/232, 321.77, 210/321.86, 322, 323.1, 450, 451, 493.1, 493.4, 497.1

(56) References Cited

U.S. PATENT DOCUMENTS

| | | | |
|---|---|---|---|
| 4,517,085 | * 5/1985 | Driscoll et al. ...................... | 210/232 |
| 4,548,714 | * 10/1985 | Kirwan, Jr. et al. .................. | 210/232 |
| 4,814,079 | * 3/1989 | Schneider ......................... | 210/321.83 |
| 5,108,604 | * 4/1992 | Robbins ........................... | 210/321.74 |
| 5,460,720 | * 10/1995 | Schneider ......................... | 210/321.86 |

* cited by examiner

Primary Examiner—John Kim
(74) Attorney, Agent, or Firm—Austin R. Miller

(57) ABSTRACT

A fluid separation element assembly comprises a fluid separation element having a membrane unit and a wrapping material formed around the membrane unit, an anti-telescoping plate attached to at least one end of the fluid separation element at a condition free to be detached, and a feed water seal member for preventing feed water from leaking through a gap between the fluid separation element and the anti-telescoping plate. The membrane unit is formed by a separation membrane, a permeate carrier material and a feed carrier material which are spirally wound around a permeate collection tube. By providing the anti-telescoping plate detachably, when the separation membrane has reached its life, it is possible to reuse other members. By providing the feed water seal member, it is possible to ensure a large diameter of the fluid separation element as well as to appropriately prevent leakage of feed water into a gap between a pressure vessel and the fluid separation element, thereby increasing the amount of treated water and improving the quality of the treated water.

29 Claims, 17 Drawing Sheets

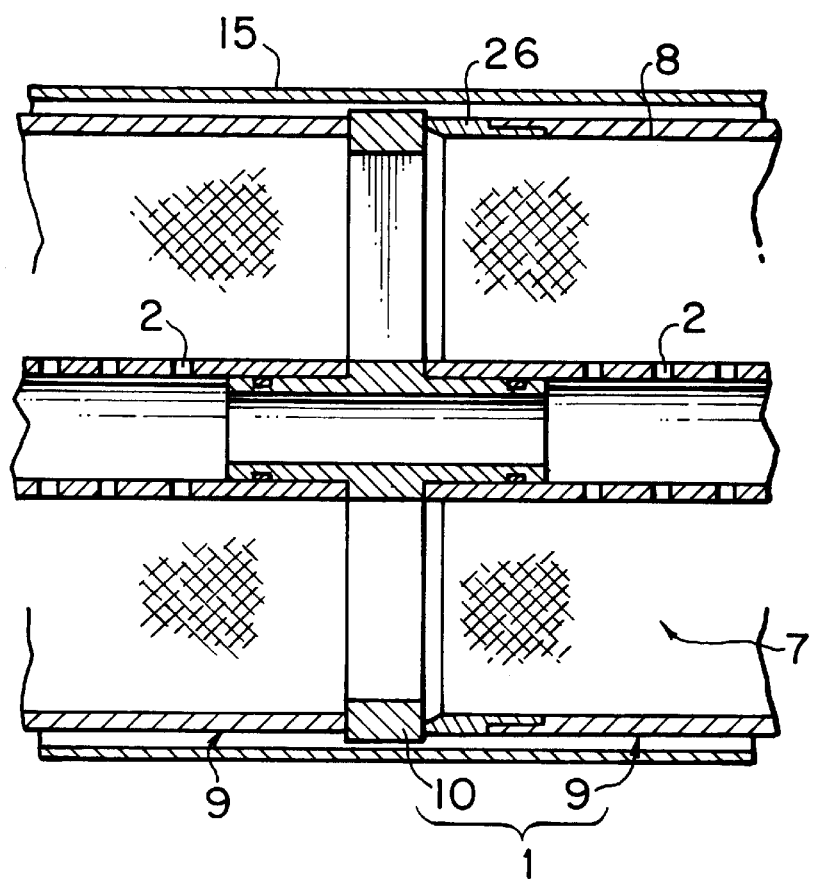
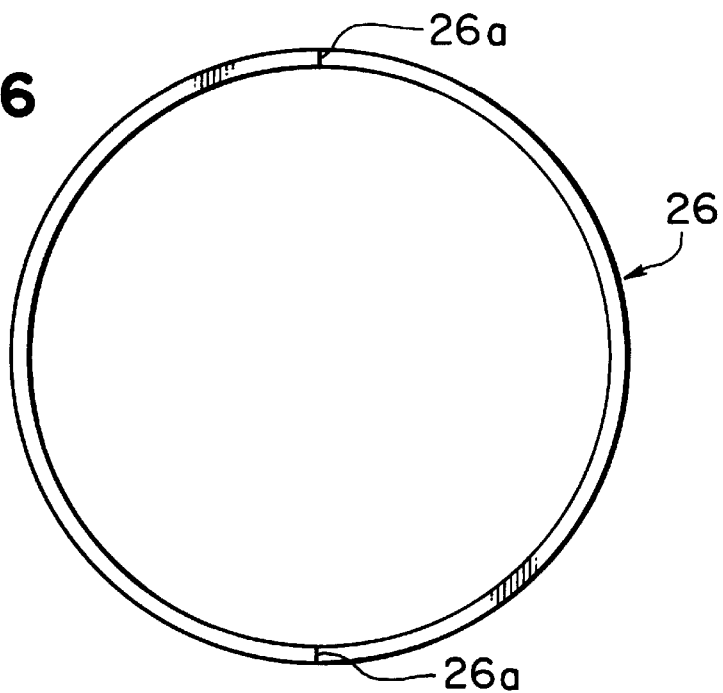

FLUID SEPARATION ELEMENT ASSEMBLY

BACKGROUND OF THE INVENTION

1. Field of the Invention

The present invention relates to a fluid separation element assembly, and more specifically to a fluid separation element assembly which is suitable for use in an apparatus for reverse osmosis, ultrafiltration or microfiltration.

2. Description of the Related Art

Generally, a spiral type fluid separation element assembly is formed, for example, as shown in FIG. 20. In FIG. 20, a permeate carrier material 156 is disposed between a first separation membrane 154 and a second separation membrane 155, the first separation membrane 154 and second separation membrane 155 are closed at three sides by, for example, an adhesive, and the remaining one side is opened in a direction toward a permeate collection tube 153 having permeate collection openings 152 to form an envelope member. A membrane unit 160 including this envelope member and a feed carrier material 157 is spirally wound around the permeate collection tube 153. An anti-telescoping plate 158 is attached on the downstream-side end surface of the wound membrane unit 160, a seal holder 159 is attached on the upstream-side end surface thereof, and a wrapping material 161 is formed on the periphery of the membrane unit 160. As the seal holder 159, generally the same plate as the anti-telescoping plate 158 is used.

In such a fluid separation element assembly 151, feed water having entered from the side of seal holder 159 through a feed water passage 162 is separated to water 164a permeated through separation membranes 154 and 155 and the remaining feed water 164b during being passed through feed carrier material 157. The permeated water 164a is discharged from the exit of permeate collection tube 153, and the remaining feed water 164b (concentrated water) is discharged from the exit of anti-telescoping plate 158, respectively. Anti-telescoping plate 158 prevents a telescoping deformation of fluid separation element 151 due to a pressure loss caused when feed water 163 passes through feed carrier material 157. Anti-telescoping plate 158 and seal holder 159 are integrally combined with membrane unit 160 so that they are not easily harmed by the load originating from the pressure loss. Therefore, when fluid separation element 151 has deteriorated to a condition that it cannot further be used, for example, because of reduction of separation performance of the separation membrane, the members such as anti-telescoping plate 158 and permeate collection tube 153 are discarded without being reused, even if they are still usable.

On the other hand, a fluid separation element assembly having a detachable anti-telescoping plate is disclosed in U.S. Pat. No. 4,906,372. In the fluid separation element assembly, as shown in FIG. 21, because there is no means for preventing feed water from leaking toward the periphery side of a fluid separation element 151 from a gap between the fluid separation element 151 and an anti-telescoping plate 158 attached on the upstream-side end surface of the fluid separation element 151, a net member 165 is provided on the periphery of the fluid separation element 151.

In the fluid separation using such a conventional fluid separation element assembly, as shown in FIG. 22, fluid separation element 151 is contained in a pressure vessel 166 to be used as a fluid separation membrane module 167. Net member 165 attached on the periphery of fluid separation element 151 is also contained, and the gap between pressure vessel 166 and fluid separation element 151 may be sealed.

In this case, although net member 165 has elasticity, in order that the net member 165 is shrunk when it is inserted into pressure vessel 166, it is necessary to carefully finish the accuracy of the diameter of fluid separation element 151 and the thickness of the net member 165, depending upon the variable accuracy of the inner diameter of the pressure vessel 166.

In practice, however, fluid separation element 151 undergoes a dispersion in its diameter more or less, depending upon a dispersion of the thickness of the member(s) used for the fluid separation element 151. Because relatively many different kinds of members are used for fluid separation element 151 and a relatively large amount of them is used therefor, for example, in an 8 inch fluid separation element, there occurs a dispersion in the thickness of the diameter of the fluid separation element of 2 to 3 mm. When the diameter of fluid separation element 151 including net member 165 is smaller than the inner diameter of pressure vessel 166, the net member 165 does not comes into contact with the pressure vessel 166, and because the gap between the pressure vessel 166 and the fluid separation element 151 cannot be sealed, a relatively large amount of feed water 163 passes through the gap between the pressure vessel 166 and the fluid separation element 151. As a result, the amount of feed water 163 passing along the surface of the separation membrane decreases, the concentration polarization on the surfaces of separation membranes 154 and 155 becomes great, and the amount of permeated water 164a decreases as well as the salt rejection performance in the membrane separation is greatly reduced. Particularly, in a process such as desalting of sea water in which the feed water has a high salt concentration, the affection due to the concentration polarization is great, the quality of the permeated water 164a is remarkably reduced.

It may be possible to increase the property of shrinkage of net member 165 by making the diameter of the portion of membrane unit 160 fairly smaller than the inner diameter of pressure vessel 166 in anticipation of the dispersion of the diameter of fluid separation element 151, and by making the net member 165 thick. In this case, however, because it is necessary to make the portion of membrane unit 160 of fluid separation element 151 small, the effective membrane area becomes small, and the amount of water treated by the fluid separation element 151 is decreased.

SUMMARY OF THE INVENTION

Accordingly, it is an object of the present invention to provide a fluid separation element assembly which enables reuse of the fluid separation members, and which can appropriately prevent leakage of feed water and still ensure a large effective membrane area as well.

It is another object of the present invention to provide a fluid separation membrane module using such a fluid separation element assembly, which can achieve excellent performance.

To achieve the foregoing and other objects, a fluid separation element assembly according to the present invention comprises a fluid separation element having a membrane unit and a wrapping material formed around said membrane unit, the membrane unit being formed by a separation membrane, a permeate carrier material and a feed carrier material which are spirally wound around a permeate collection tube; an anti-telescoping plate attached to at least one end of the fluid separation element at a condition free to be detached; and feed water seal means for preventing feed water from leaking through a gap between the fluid separation element and the anti-telescoping plate.

The feed water seal means, for example, comprises a ring member provided on at least one end of the wrapping material and projecting in the axial direction of the fluid separation element. The ring member is preferably composed of a material having a flexural strength of 50 MPa or more. The ring member may be formed as either a ring formed integrally over the entire circumference or a divided ring having seams at positions in the circumferential direction of the ring member. The ring member preferably comes into contact with the anti-telescoping plate.

A separate seal ring, which works in combination with the feed water seal means, may be attached to a periphery of the anti-telescoping plate. The seal ring is preferably attached in a groove formed on the periphery of the anti-telescoping plate. In this case, a side wall located at a position upstream of the groove in the flow direction of the feed water may be taller than a side wall located at a position downstream of the groove in the flow direction of the feed water, and the seal ring attached in the groove may come into contact with the fluid separation element. In particular, the seal ring attached in the groove may come into contact with the ring member provided on the wrapping material.

The feed water seal means may alternatively be constituted as another formation. For example, a ring portion projecting toward a fluid separation element side is provided on a radially outer portion of the anti-telescoping plate. In this embodiment, the feed water seal means is provided between the projected ring portion and a periphery of the fluid separation element, or the feed water seal means covers an area extending from a periphery of the projected ring portion to a periphery of the fluid separation element.

Also in such a structure, a seal ring may be attached on a periphery of the anti-telescoping plate. The seal ring is preferably attached in a groove formed on the periphery of the anti-telescoping plate.

The anti-telescoping plate, for example, comprises a disc portion having a feed water passage and a joint tube portion provided in a central portion of the disc portion and having a permeated water passage. Preferably, the anti-telescoping plate further comprises a member preventing feed water from entering into the permeate collection tube. The disc portion and the joint tube portion either may be integrally formed, or may be formed separately from each other. The joint tube portion is preferably inserted into the permeate collection tube.

The feed carrier material, for example, comprises a net. Preferably, the net has meshes each shaped as a rhombus, the net is disposed so that a longer axis of the rhombus is directed in the flow direction of the feed water, the angle of a side of the rhombus is in a range of ±15 to ±45 degrees relative to the flow direction of the feed water, the thickness of the net is in a range of 0.5 to 0.9 mm, and the length of the longer axis of the rhombus is in a range of 3 to 8 mm.

Further, another embodiment of the fluid separation element assembly according to the present invention comprises a fluid separation element having a membrane unit and a wrapping material formed around the membrane unit, the membrane unit being formed by a separation membrane, a permeate carrier material and a feed carrier material which are spirally wound around a permeate collection tube; an anti-telescoping plate attached to at least one end of the fluid separation element at a condition free to be detached; and a seal ring attached on a periphery of the anti-telescoping plate for sealing a gap between the periphery of the anti-telescoping plate and an inner surface of a pressure vessel containing the fluid separation element and the anti-telescoping plate.

In this fluid separation element assembly, preferably the seal ring is attached in a groove formed on the periphery of the anti-telescoping plate. In this case, a side wall located at a position upstream of the groove in the flow direction of feed water may be taller than a side wall located at a position downstream of the groove in the flow direction of the feed water, and the seal ring attached in the groove may come into contact with the fluid separation element.

A fluid separation membrane module according to the present invention may be constructed by containing a plurality of the above-described fluid separation element assemblies in a pressure vessel. In the module, preferably the pressure vessel has a lid at its each axial end, and between the lid and an anti-telescoping plate of a fluid separation element assembly located at a most upstream position in the flow direction of feed water, means for pressing the anti-telescoping plate in the axial direction of the pressure vessel is provided.

In the fluid separation element assembly according to the present invention, because the anti-telescoping plate is attached to the fluid separation element at a condition free to be detached, even when the fluid separation element assembly has fallen in a unusable condition (for example, when the separation membrane has reached its life), it may be possible to discard only the members having defects and to reuse other members, for example, the anti-telescoping plate and seal members, and as the case may be, the permeate collection tube. In such a fluid separation element assembly having a detachable anti-telescoping plate, by providing the feed water seal means for preventing the leakage of feed water through a gap between the fluid separation element and the anti-telescoping plate, a large amount of feed water can be prevented from passing through a gap between the pressure vessel and the fluid separation element assembly. As a result, the concentration polarization on the surface of the separation membrane may be suppressed small, and a fluid separation element assembly having a high separation performance can be realized.

Further, in the fluid separation element assembly having a detachable anti-telescoping plate, by providing the seal ring capable of sealing a gap between the periphery of the anti-telescoping plate and the inner surface of the pressure vessel, the leakage of feed water through the gap between the pressure vessel and the fluid separation element can be appropriately suppressed at a position of the anti-telescoping plate, without consideration of a dispersion of the diameter of the fluid separation element. Therefore, a large amount of feed water passing on the surface of the separation membrane of the fluid separation element can be ensured, the concentration polarization on the separation membrane may be maintained small, a large amount of permeated water can be ensured, and a good property for salt rejection in the membrane separation can be ensured. Moreover, it may be possible to enlarge the diameter of the fluid separation element, and with respect to the radial direction, the effective membrane area may be increased. As a result, the amount of the treatment may be greatly increased and the quality of the treated water may be greatly improved.

In the assembly of the fluid separation membrane module using the fluid separation element assemblies according to the present invention, it is possible to connect the fluid separation elements to each other by an anti-telescoping plate itself by providing a joint tube portion to the anti-telescoping plate. In such a fluid separation membrane module, for example, as compared with a conventional module wherein an anti-telescoping plate is combined integrally with a fluid separation element and a relatively large space is required for connecting the fluid separation element assemblies to each other, a space required for the connection can be greatly decreased. Therefore, in a fluid separation membrane module connecting a plurality of fluid separation elements, it is possible to increase the effective length of each fluid separation element in the module, and with respect to the axial direction of the fluid separation element, the effective membrane area can be increased, thereby increasing the ability of the treatment greatly. Moreover, in the fluid separation membrane module using the fluid separation element assemblies according to the present invention, because basically it is not necessary to change structural members such as the pressure vessel, the cost for manufacture may be suppressed low.

Further objects, features, and advantages of the present invention will be understood from the following detailed description of the preferred embodiments of the present invention with reference to the accompanying figures.

BRIEF DESCRIPTION OF THE DRAWINGS

Preferred embodiments of the invention are now described with reference to the accompanying figures, which are given by way of example only, and are not intended to limit the present invention.

FIG. 5 is a partial vertical sectional view of a fluid separation membrane module showing a structure of feed water seal means according to another embodiment of the present invention.

FIG. 6 is an elevational view showing an example of the structure of a feed water seal member according to an embodiment of the present invention.

DETAILED DESCRIPTION OF THE PREFERRED EMBODIMENTS

Figure 1:
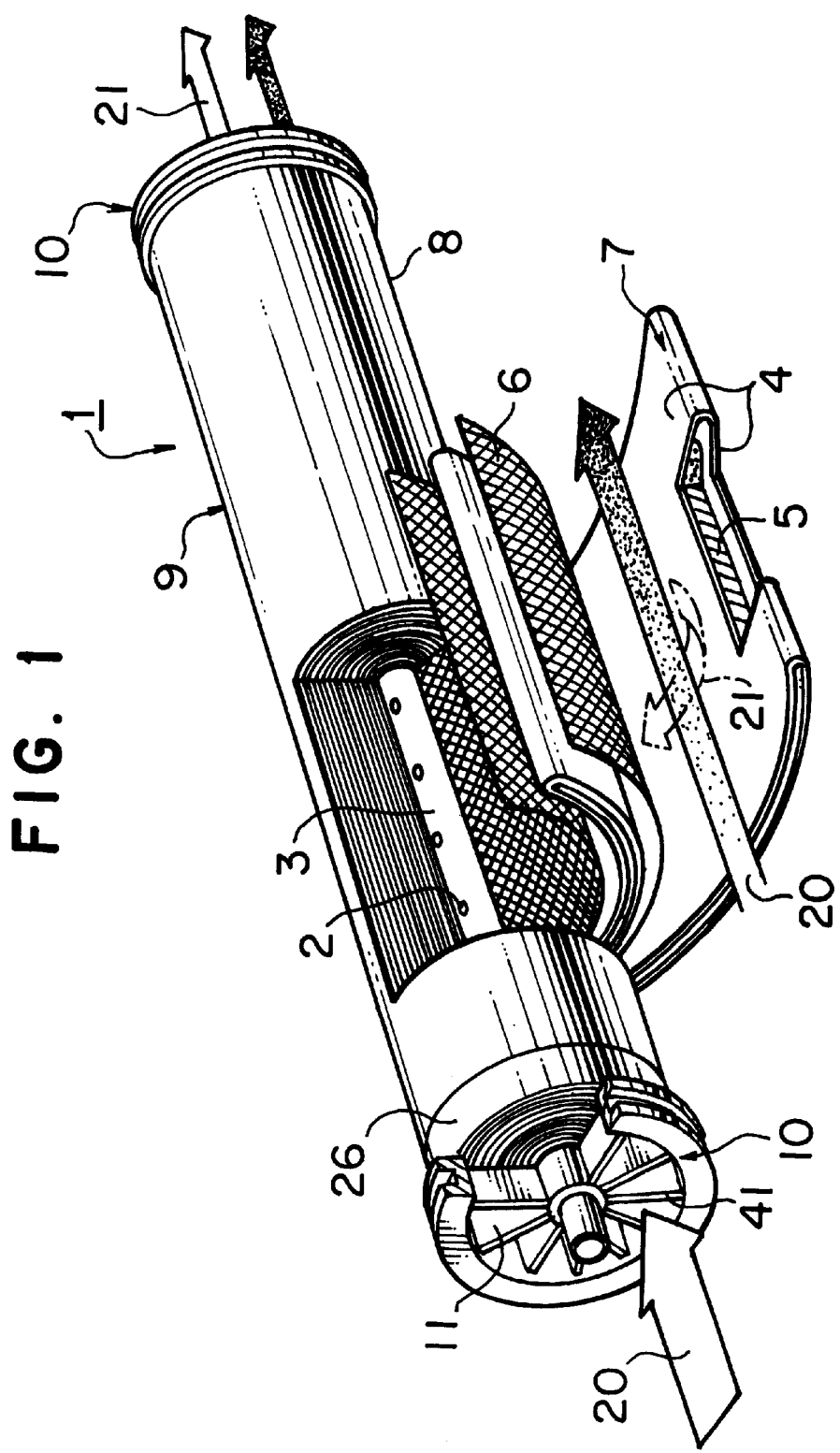
FIG. 1 is a perspective view of a fluid separation element assembly according to an embodiment of the present invention.

FIG. 1 shows a fluid separation element assembly according to an embodiment of the present invention. In fluid separation element assembly 1 shown in FIG. 1, membrane unit 7 including separation membrane 4, permeate carrier material 5 and feed carrier material 6 is spirally wound around permeate collection tube 3 having permeate collection openings 2, and wrapping material 8 is formed on the periphery of the membrane unit 7 to form a fluid separation element 9. The axial end surfaces of fluid separation element 9 are exposed, and an anti-telescoping plate 10 is attached to at least one end of the fluid separation element 9 in order to prevent a telescoping deformation of the fluid separation element 9. Anti-telescoping plate 10 is attached to the end of fluid separation element 9 free to be detached so that the fluid separation element 9 and the anti-telescoping plate 10 can be exchanged as needed. If an anti-telescoping plate is fixed in a fluid separation element assembly at a condition that the anti-telescoping plate cannot be easily detached, when the assembly has deteriorated to a condition where the fluid separation cannot be sufficiently performed by, for example, reduction of the separating ability of the separation membrane, the whole of the fluid separation element assembly must be discarded. Even in such a case, in fluid separation element assembly 1 according to the present invention, because anti-telescoping plate 10 is detachably provided, it is possible to exchange only membrane unit 7 and reuse anti-telescoping plate 10 and, in addition, the permeate collection tube 3 as the case may be.

Figure 2:
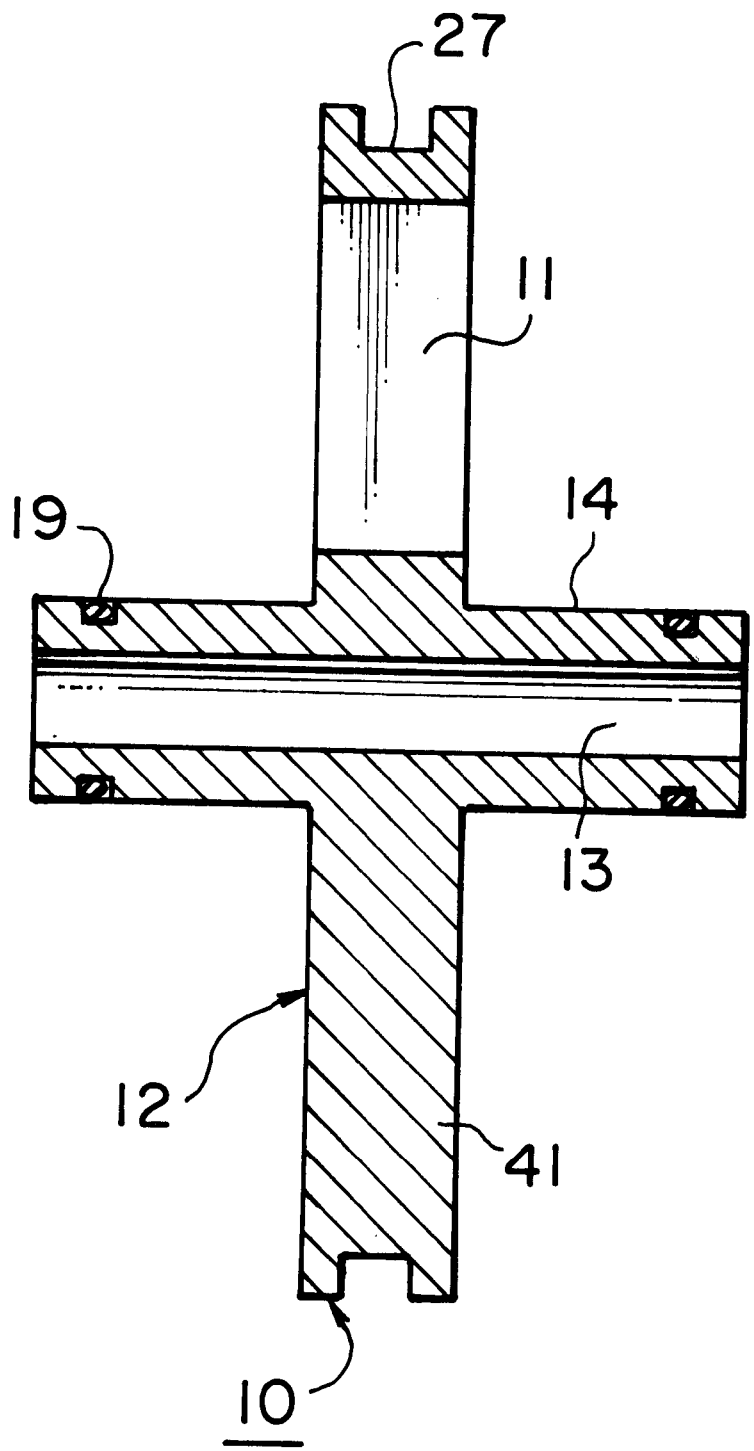
FIG. 2 is an enlarged vertical sectional view of an anti-telescoping plate of the fluid separation element assembly shown in FIG. 1.

Anti-telescoping plate 10 according to the present invention, for example, as shown in FIG. 2, comprises disc portion 12 having feed water passages 11, and joint tube portion 14 provided in the central portion of the disc portion 12, which has permeated water passage 13 and on which a member 19 preventing feed water from entering into permeate collection tube 3 (feed water entering prevention member) such as an O-ring is attached. Because anti-telescoping plate 10 has not only feed water passages 11 and permeated water passage 13 but also joint tube portion 14, a particular connecting member, which has been required in a conventional device when a plurality of fluid separation element assemblies are connected in series, is not required. As a result, the space for connection is saved, and when the assemblies are positioned in a pressure vessel to use as a fluid separation membrane module, the portion of the fluid separation element can be formed to be long, or elongated thereby improving ability and efficiency.

On the joint tube portion 14, feed water entering prevention member 19 is attached for preventing feed water from entering into permeated water. The feed water entering prevention member 19 is attached at a position nearer the end of permeate collection tube 3 than the position of the end permeate collection opening 2 when anti-telescoping plate 10 is attached to fluid separation element 9, and thus, feed water from permeate collection openings 2 is prevented from entering into permeated water. Moreover, by making the distance between feed water entering prevention member 19 and anti-telescoping plate 10 longer than the distance between the anti-telescoping plate 10 located at the most upstream position and a lid of a pressure vessel, feed water is prevented from entering into permeate collection tube 3 even if the anti-telescoping plate 10 or fluid separation element 9 moves in the pressure vessel during use. For example, in case of a fluid separation element having a general length of 1016 mm, feed water entering prevention member 19 is preferably located at a position in the range of 20 to 90 mm from the end of permeate collection tube 3.

Joint tube portion 14 is inserted into permeate collection tube 3 of fluid separation element 9. Therefore, the diameter of joint tube portion 14 is set to be smaller than the inner diameter of permeate collection tube 3 of fluid separation element 9, and in order to suppress the backlash when connected to the fluid separation element 9 small and improve the seal ability of feed water, the difference between the diameters is preferably in the range of 0.01 to 0.5 mm. Further, it is preferred that joint tube portion 14 projects from the side surface of anti-telescoping plate 10 by a length in the range of 25 to 100 mm. In order to ensure the permeated water passage sufficiently large and joint tube portion 14 sufficiently strong, the difference between the outer diameter and the inner diameter of the joint tube portion 14 is preferably in the range of 6 to 16 mm, more preferably in the range of 8 to 14 mm.

Disc portion 12 of anti-telescoping plate 10 is preferably composed of a material having a high stiffness, which has a flexural strength of 50 MPa or more, in order to obtain a sufficiently large feed water passage 11 and the sufficiently great strength. As such a material having a high stiffness, for example, a metal, a plastic and an FRP can be used, and in particular, a stainless steel which is hardly affected by a corrosion such as rust caused during use, polyphenylene oxide, polycarbonate, hard vinyl chloride, etc. are preferred. Disc portion 12 is preferred to be thin in order to lengthen fluid separation element 9 and enlarge the membrane area, but preferred to be thick in order to obtain a high strength. To increase the strength, ribs 41 of anti-telescoping plate 10 are preferred to be thick in the circumferential direction of the anti-telescoping plate 10. In consideration of these matters, when the above-described materials are used, the thickness of disc portion 12 of anti-telescoping plate 10 is preferably in the range of 5 to 35 mm. The shape of disc portion 12 may be greater than the size of the cross section of fluid separation element 9, and when assembled as a fluid separation membrane module, it may be a size capable of being contained in a pressure vessel.

For fluid separation, a plurality of the above-described fluid separation element assemblies are connected and contained in a pressure vessel to form a fluid separation membrane module.

Figure 3:
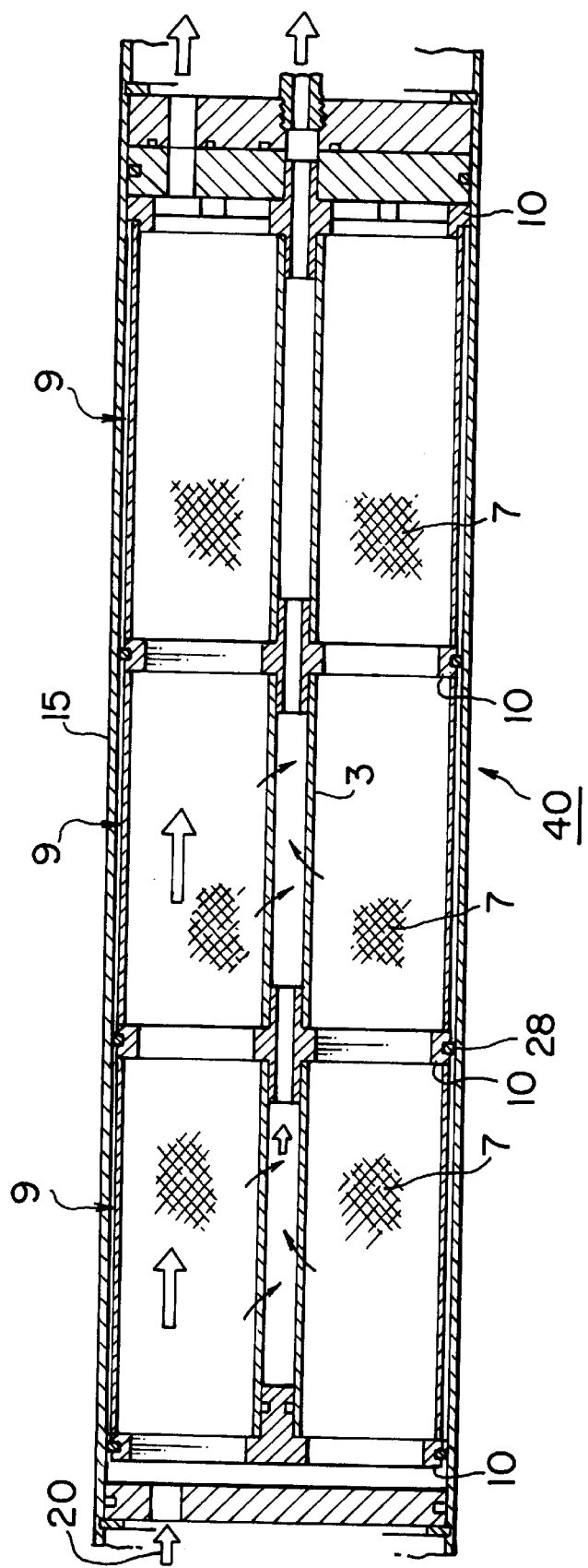
FIG. 3 is a vertical sectional view of a fluid separation membrane module according to an embodiment of the present invention.
Figure 4:
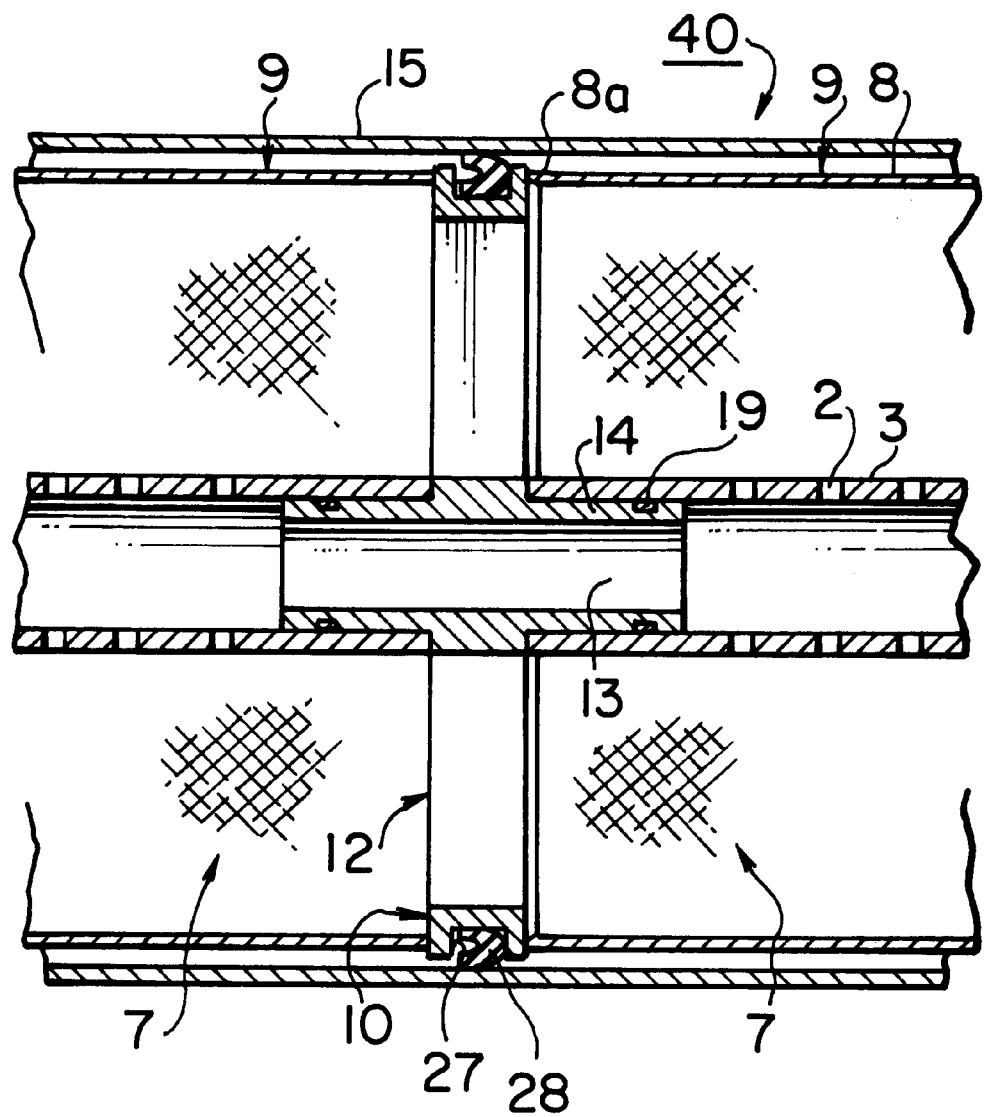
FIG. 4 is a partial vertical sectional view of a fluid separation membrane module showing a structure of feed water seal means according to an embodiment of the present invention.

In a fluid separation membrane module according to the present invention, for example, as shown in FIGS. 3 and 4, two fluid separation elements 9 adjacent to each other are connected via a single anti-telescoping plate 10. Therefore, because the space required for the connection is a space corresponding to the thickness of one anti-telescoping plate 10, as compared with a conventional fluid separation membrane module wherein an anti-telescoping plate is attached to each end of a fluid separation element and further another particular member for the connection is required, each fluid separation element 9 can be lengthened in the axial direction and a plurality of the long fluid separation elements can be contained in a conventional pressure vessel. Accordingly, without change of the outer size, the effective membrane area in the module can be increased, and the amount of water to be treated per one fluid separation element can be increased. On the other hand, when the same amount of water to be treated as that of the conventional module is ensured, because the operation pressure for the treatment can be reduced, the cost for the treatment can be reduced. When a new plant is built, not only the numbers of pipes, pressure vessels, etc. can be decreased but also a low pressure pump can be employed and the pressure resistance of the pipes and the pressure vessels can be designed to be low, and the initial cost may be greatly decreased.

In the fluid separation using such a fluid separation membrane module 40, as shown in FIG. 1, feed water 20 supplied into a pressure vessel passes through feed water passage 11 of anti-telescoping plate 10 and enters membrane unit 7 of fluid separation element 9. While feed water 20 fed into membrane unit 7 flows along feed carrier material 6 downstream, a part of the feed water is permeated through separation membrane 4 and unnecessary ingredients such as salt are removed, and permeated water 21 flows into permeate carrier material 5. The permeated water 21 flown into permeate carrier material 5 flows toward permeate collection tube 3 positioned at the central portion of fluid separation element 9. Permeated water 21 having reached permeate collection tube 3 enters into the tube 3 through permeate collection openings 2, and then flows therein in the downstream direction. The permeated water 21 in permeate collection tube 3 flows through the permeated water passage of a joint tube portion 14 of a next anti-telescoping plate 10 and enters a permeate collection tube 3 of a next fluid separation element 9. Feed water which has not been treated by one fluid separation element 9 (concentrated water) goes forward to a next fluid separation element 9 through feed water passage 11 of anti-telescoping plate 10, and it is treated by the downstream side (next) fluid separation element 9.

In such a flow condition, feed water may also flow through a gap between pressure vessel 15 and wrapping material 8 of fluid separation element 9. By the flow of the feed water through the gap between pressure vessel 15 and fluid separation element 9, generation of micro-organism and decay of organic substances present in the feed water, which are likely to be caused by the residence of the feed water in the gap, may be prevented. However, if the amount of the flown feed water is too much, the amount of the feed water flowing along the separation membrane decreases, the concentration polarization on the surface of the separation membrane becomes great, and therefore, not only the amount of permeated water and the salt rejection percent decrease but also the amount of deposit on the surface of the separation membrane increases. As a result, not only the times of the treatment for producing purified water increases but also the time required for the treatment becomes long, and besides, the life of the separation membrane is shortened.

In the present invention, feed water seal means is provided in order to prevent feed water from leaking from a gap between fluid separation element 9 and anti-telescoping plate 10 to a gap between pressure vessel 15 and wrapping material 8 of the fluid separation element 9. Further, a seal ring is provided on the periphery of anti-telescoping plate 10 free to be detached in order to prevent a large amount of feed water from flowing straightly through the portion of the periphery of the anti-telescoping plate 10 and leaking into a gap between pressure vessel 15 and a next fluid separation element 9.

Feed water seal means for preventing feed water through a gap between fluid separation element 9 and anti-telescoping plate 10 may be constructed from a ring member provided on at least one end of wrapping material 8 and projecting in the axial direction of the fluid separation element 9. This ring member provided as feed water seal means, for example, as shown in FIG. 4, may be formed as an axially projected ring portion 8*a* of wrapping material 8 itself, which axially projects from the axial end surface of membrane unit 7. Alternatively, as shown in FIG. 5, a feed water seal member 26, formed separately from wrapping material 8, may be provided on the axial end portion of the wrapping material 8, and the feed water seal member 26 projecting axially from the end surface of membrane unit 7 may be brought into contact with anti-telescoping plate 10. By such a feed water seal member 8*a* or 26, a large amount of feed water can be prevented from leaking into a gap between pressure vessel 15 and fluid separation element assembly 1 (or fluid separation element 9). The thickness of feed water seal member 8*a* or 26 is preferred to be in the range of 0.5 to 5 mm from the viewpoint of strength and membrane area, and from the viewpoint of sealing ability, the feed water seal member is preferred to be projected by an axial length in the range of 1 to 10 mm from the end surface of membrane unit 7. When a pressure loss in fluid separation element 9 is relatively high, because a force is applied to feed water seal member 8*a* or 26 to deform the seal member 8*a* or 26 from the inside to the outside of the fluid separation element 9, the feed water seal member 8*a* or 26 is preferably formed from a material having a high stiffness, for example, having a flexural strength of 50 MPa or more. As such a material having a high stiffness, for example, a metal, a plastic and an FRP can be used, and in particular, a stainless steel which is hardly affected by a corrosion such as rust caused during use, polyphenylene oxide, polycarbonate, hard vinyl chloride, etc. are preferred. Generally, an FRP is used as a material of a wrapping material of a fluid separation element. In this case, the portion formed as the feed water seal member can be easily molded integrally with the FRP wrapping material by using an appropriate mold, and because a new member is not required, FRP is particularly preferred as the material of the feed water seal member.

When the concentration of feed water is relatively low such as a case of desalting of brackish water, because the concentration polarization on the surface of the separation membrane hardly increases even if feed water leaks from a seal portion, a relatively rough feed water seal member may be used, without decreasing the ability of the fluid separation element assembly such as the salt rejection property and the amount of water to be treated. For example, a feed water seal member having a small flaw, a feed water seal member having a notch of about 1 to 30 mm or a snap ring-like feed water seal member having a gap in the circumferential direction may be used. Alternatively, as shown in FIG. 6, a feed water seal member 26 formed as a divided ring having seams 26*a* at positions in the circumferential direction may be also used. For example, in case of using an 8 inch fluid separation element assembly, if feed water can flow in the fluid separation element assembly at a flow rate of $30 \times 10^{-3}$ m$^3$/min. or more as the flow rate at its exit, fluid separation can be performed without affection due to the leakage of feed water from a gap.

In a case where a seal ring is provided on the periphery of anti-telescoping plate 10, as shown in FIG. 4, it is preferred that a groove 27 is defined on the periphery of anti-telescoping plate 10 for fixing seal ring 28 and the seal ring 28 is fitted into the groove 27. In this case, seal ring 28 is preferably formed from a elastic material for bringing it into contact with the inner surface of pressure vessel 15.

Figure 7:
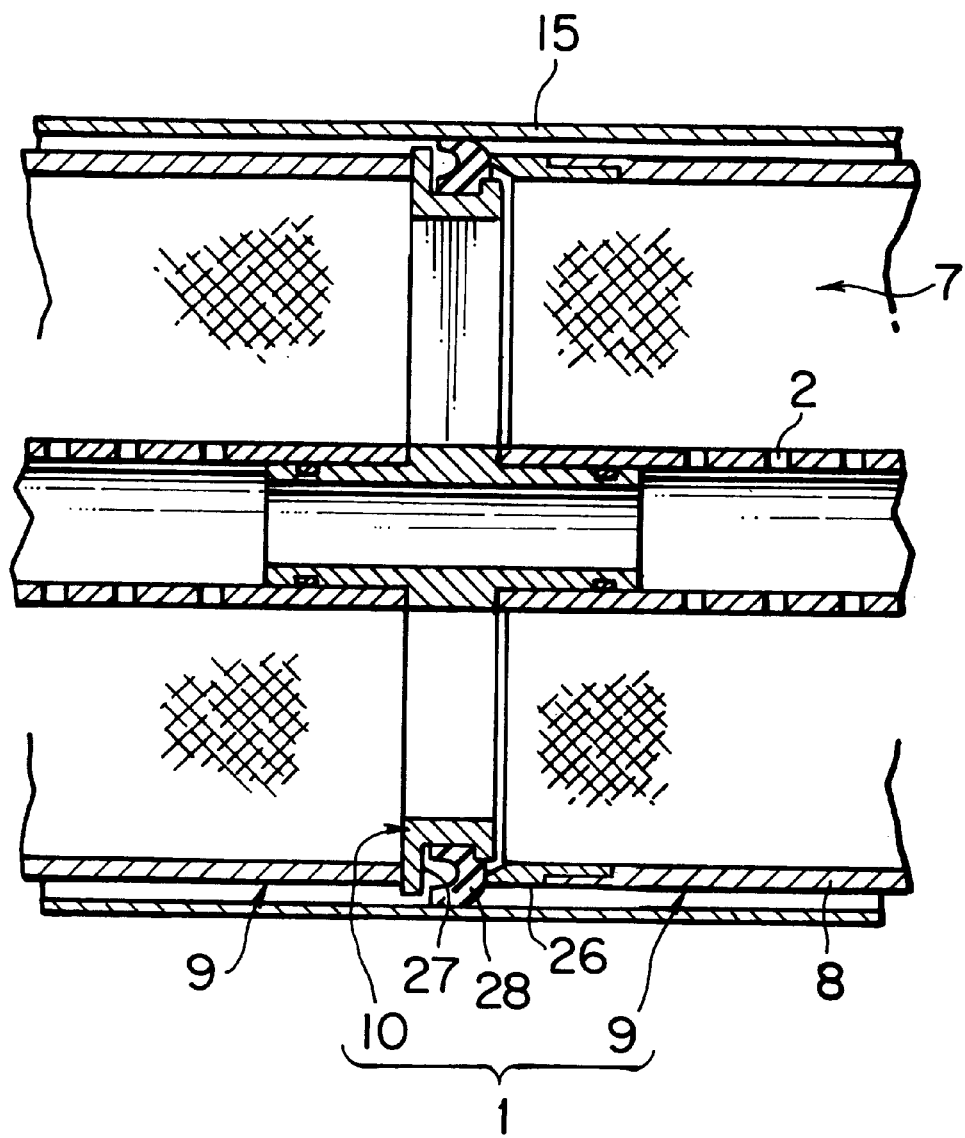
FIG. 7 is a partial vertical sectional view of a fluid separation membrane module showing a structure of feed water seal means according to a further embodiment of the present invention.
Figure 8:
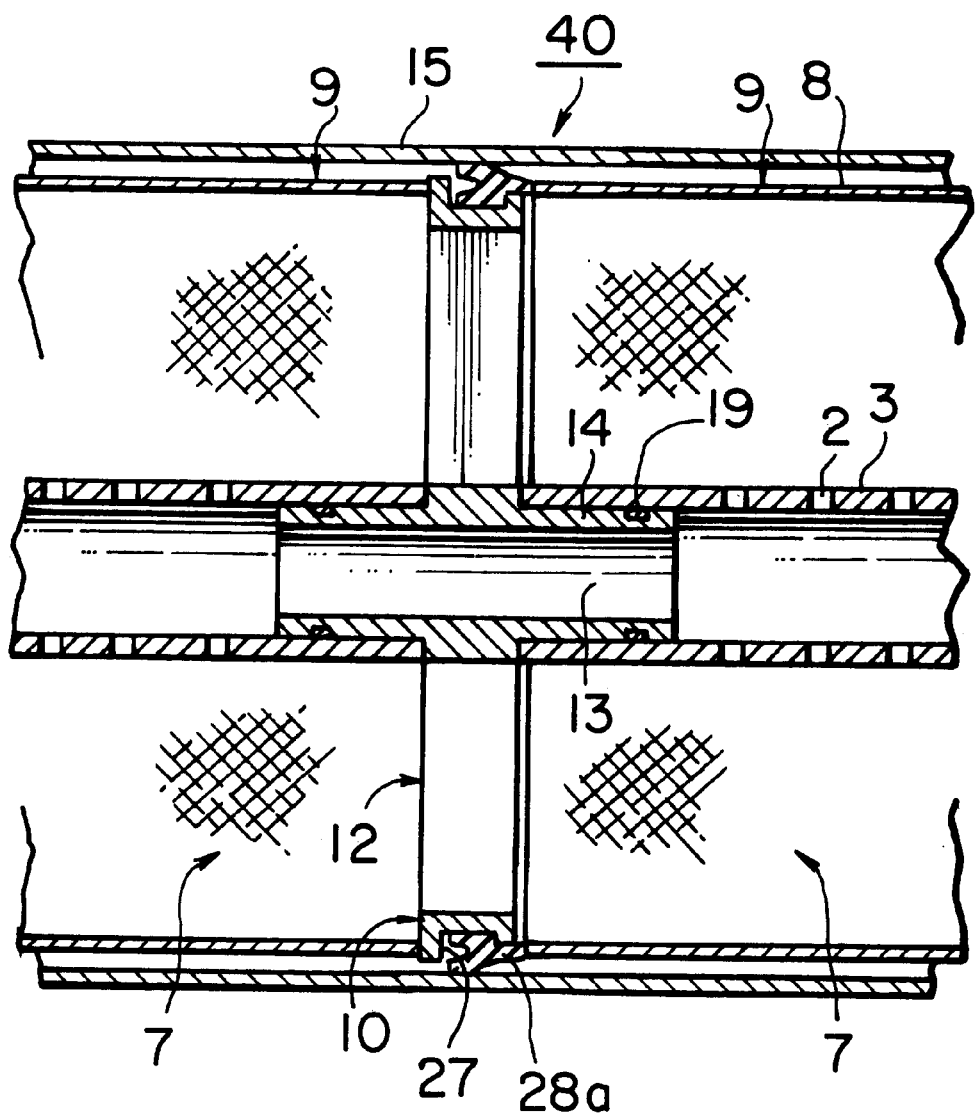
FIG. 8 is a partial vertical sectional view of a fluid separation membrane module showing a structure of feed water seal means according to a still further embodiment of the present invention.

When a feed water seal member is provided on wrapping material 8 of fluid separation element 9 and a seal ring is provided on the periphery of anti-telescoping plate 10, for example, as shown in FIG. 7, an effective sealing can be achieved by bringing projected feed water seal member 26 provided to wrapping material 8 into contact with seal ring 28 provided to anti-telescoping plate 10. Further, as shown in FIG. 8, a seal ring 28*a* having a portion projecting toward the downstream side may be attached on the periphery of anti-telescoping plate 10, and the seal ring 28*a* may comes into contact with the axial end of the wrapping material or a feed water seal member provided on the end portion of the wrapping material, for effective sealing. In such cases, it is preferred that a side wall located at a position downstream of groove 27 is formed to be lower than a side wall located at a position upstream of the groove 27.

Generally, in fluid separation using a fluid separation membrane module, there occurs a pressure loss as feed water flows in a fluid separation element assembly in the downstream direction, and there is a case where the fluid separation element assembly is deformed in a telescoping form by a thrust load caused by the pressure loss and the deformed assembly is pushed onto the downstream side. When there occurs a pressure loss of $5 \times 10^5$ Pa in an 8 inch fluid separation element assembly, the thrust load applied to the axial end surface of the fluid separation element assembly reaches $1.5 \times 10^4$ N. However, in the fluid separation membrane module according to the present invention, because there is an anti-telescoping plate between adjacent fluid separation elements, such a deformation can be prevented. In the prevention of the deformation, because projected feed water seal member 26 provided on wrapping material 8 compresses seal ring 28 provided on anti-telescoping plate 10, it is preferred that an excessive compression load can be received by permeate collection tube 3 which comes into contact with the anti-telescoping plate 10.

To an anti-telescoping plate located at the upstream portion of the most upstream side fluid separation element assembly in the pressure vessel, only a thrust load due to the pressure difference between a driving pressure at an entrance of permeate collection tube 3 and a pressure of permeated water is applied, and therefore, a sufficiently large thrust load cannot be obtained. In such a case, preferably means for pressing the anti-telescoping plate in the axial direction of the pressure vessel is provided, as described later. By providing such means, it becomes possible to push the seal ring provided on the anti-telescoping plate to the feed water seal member provided on the end of the fluid separation element with a sufficiently large force, thereby sealing feed water at this portion. The pushing force may be about 250 N in an 8 inch fluid separation element assembly, and about 70 N in a 4 inch fluid separation element assembly.

In the present invention, the following various embodiments may be employed except the above-described embodiments.

Figure 9:
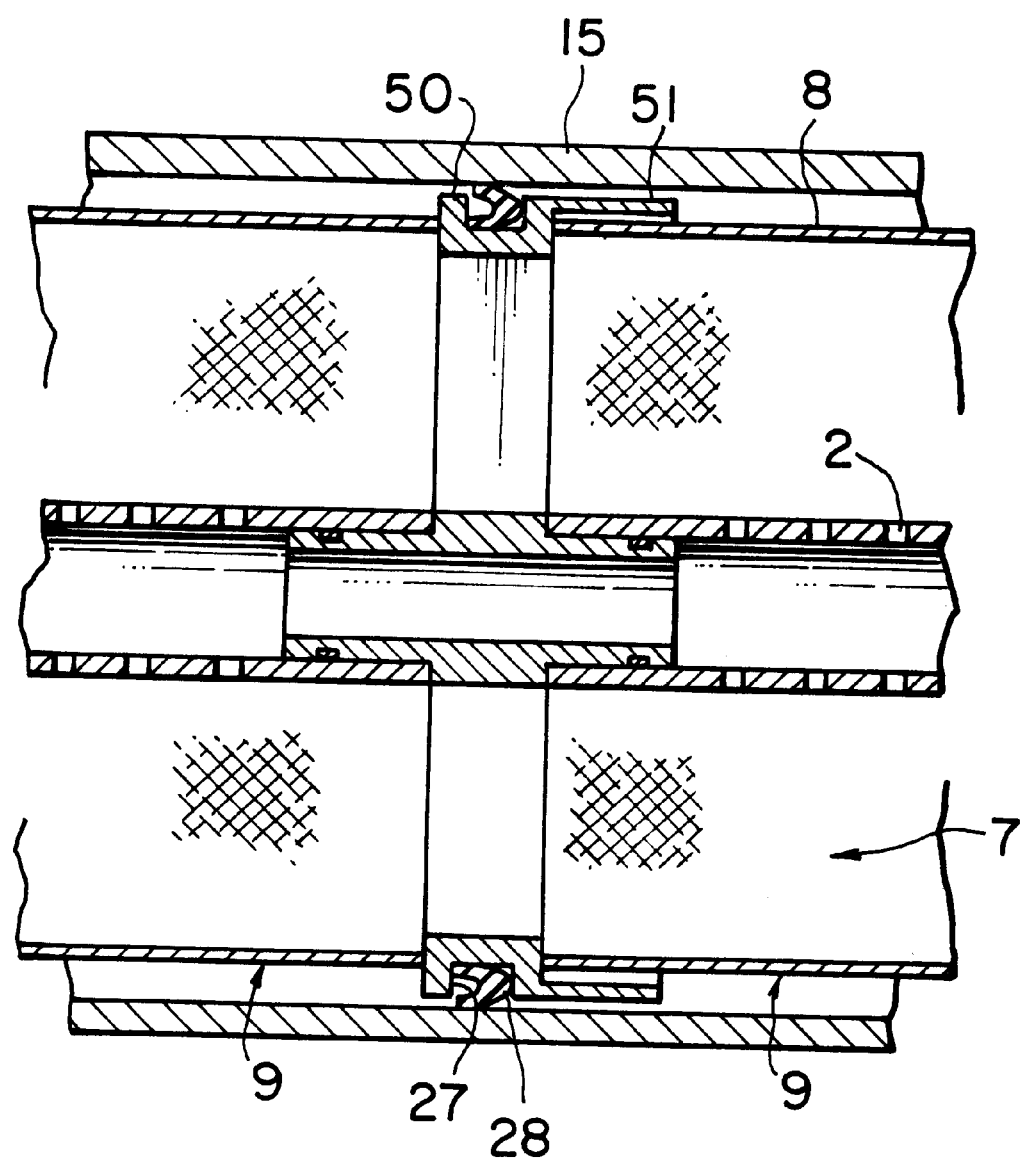
FIG. 9 is a partial vertical sectional view of a fluid separation membrane module according to a still further embodiment of the present invention.

For example, as shown in FIG. 9, a ring portion 51 projecting toward fluid separation element 9 may be provided on a radially outer portion of anti-telescoping plate 50. Groove 27 similar to that shown in FIG. 4 is defined on the periphery of anti-telescoping plate 50, and seal ring 28 is fitted into the groove 27. In such a structure, anti-telescoping plate 50 can be easily fitted to fluid separation element 9 by utilizing projected ring portion 51, and the attachment and detachment thereof can be facilitated.

Figure 10A:
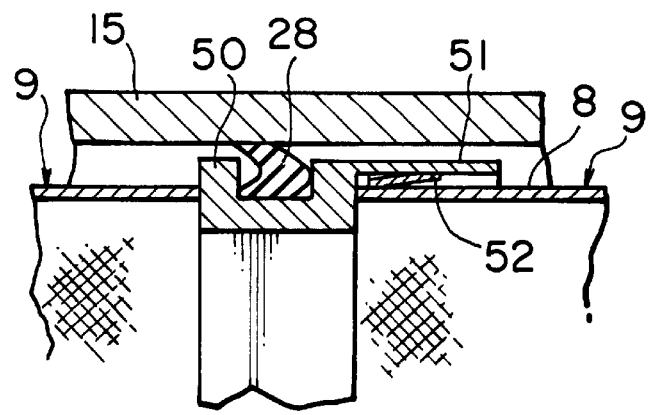
FIGS. 10A and 10B are partial vertical sectional views of fluid separation membrane modules showing structures of feed water seal means according to still further embodiments of the present invention.
Figure 10B:
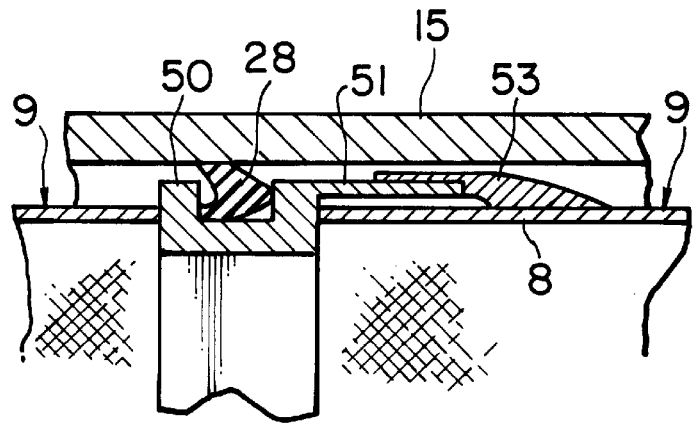

Moreover, the property for sealing feed water may be further improved by utilizing projected ring portion 51. For example, as shown in FIG. 10A, feed water seal member 52 is provided between projected ring portion 51 and the periphery of wrapping material 8 of fluid separation element 9, and a short of feed water at this portion can be suppressed. Further, as shown in FIG. 10B, feed water seal member 53 composed of a tape or an elastic material may be provided so that it covers an area extending from the periphery of projected ring portion 51 to the periphery of wrapping material 8 of fluid separation element 9, thereby suppressing a short of feed water at this portion similarly.

Figure 11:
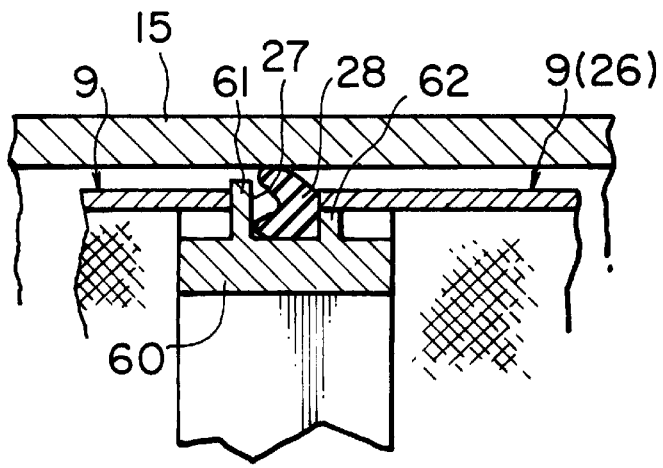
FIG. 11 is a partial vertical sectional view of a fluid separation membrane module showing a structure of feed water seal means according to a still further embodiment of the present invention.

With respect to a structure wherein groove 27 is provided on the periphery of an anti-telescoping plate and seal ring 28 is provided in the groove 27, for example, another structure as shown in FIG. 11 may be employed except the structures shown in FIGS. 4 and 7. In FIG. 11, a taller upstream side wall 61 and a lower downstream side wall 62 are provided on the periphery of anti-telescoping plate 60 so that they extend in the circumferential direction of the anti-telescoping plate 60, groove 27 is formed between both side walls 61 and 62, and seal ring 28 is fitted into the groove 27. There provided an appropriate distance between each side wall 61 or 62 and each corresponding side surface of anti-telescoping plate 60. In this embodiment, wrapping material 8 of upstream side fluid separation element 9 is projected so that the tip thereof comes into contact with the side surface of upstream side wall 61, and the projected portion of wrapping material 8 of downstream side fluid separation element 9 or a feed water seal member 26 provided on the end portion of the wrapping material 8 is fitted around downstream side wall 62 and the tip thereof is brought into contact with the side surface of seal ring 28. In such a structure, the sealing ability of feed water may be adequately increased as well as the connection of upstream and downstream side fluid separation elements 9 and anti-telescoping plate 60 interposed therebetween may be facilitated.

Further, in the present invention, various structures as shown in FIGS. 12A to 12E may be employed in order to suppress a short of feed water more appropriately.

Figure 12A:
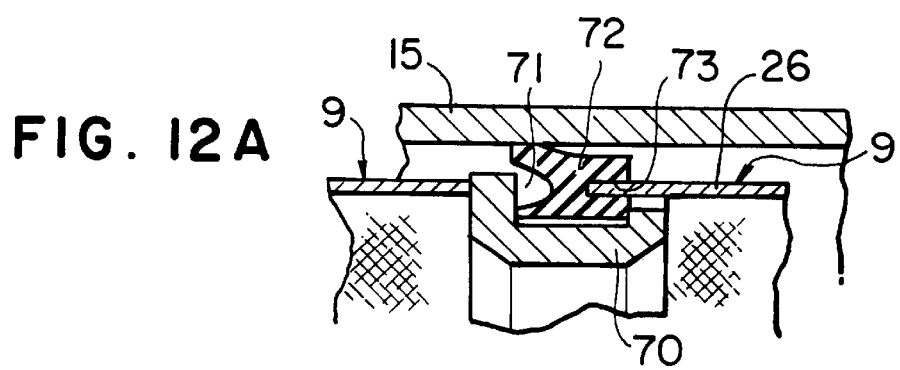
FIGS. 12A–12E are partial vertical sectional views of fluid separation membrane modules showing structures of various type seal members according to still further embodiments of the present invention.
Figure 12B:
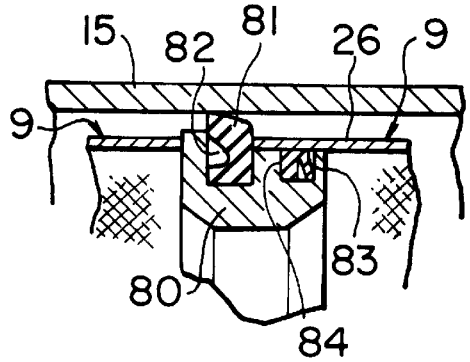
Figure 12C:
Figure 12D:
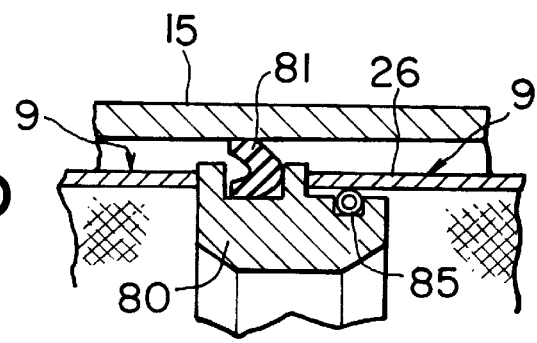
Figure 12E:
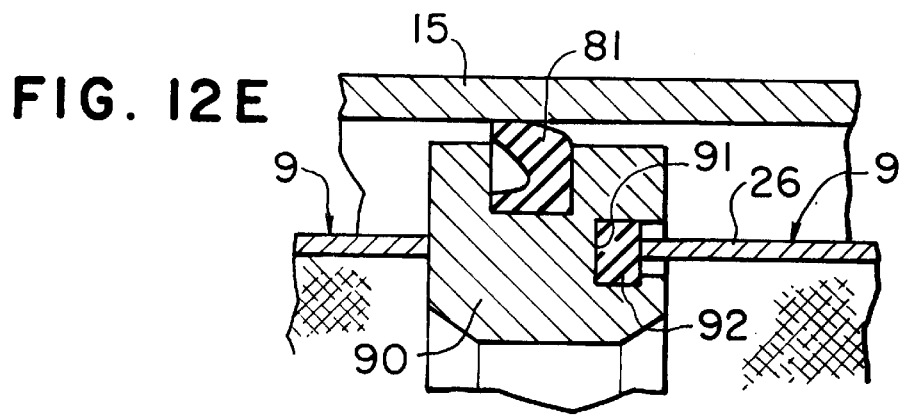

In a structure shown in FIG. 12A, seal ring 72 provided in groove 71 formed on the periphery of anti-telescoping plate 70 is formed as a shape having a groove 73 on the downstream side surface, and the tip portion of projected feed water seal member 26 provided on the end portion of wrapping material 8 of downstream side fluid separation element 9 is inserted into the groove 73. In a structure shown in FIG. 12B, groove 82 is formed on the periphery of anti-telescoping plate 80, seal ring 81 brought into contact with the inner surface of pressure vessel 15 is fitted into the groove 82, and on the downstream side thereof, a particular seal member 83 for preventing a short of feed water and a groove 84 fitted with the seal member 83 are provided. This seal member 83 is brought into contact with the inner surface of projected feed water seal member 26 provided on the end portion of wrapping material 8 of downstream side fluid separation element 9, and this portion is sealed. As the seal member 83, for example, a member having a cross section as shown in FIG. 12C also can be used. Further, as shown in FIG. 12D, O-ring 85 may be used instead of the seal member 83 having the above-described forms. Further, in accordance with the relationship between the position of the inner surface of pressure vessel 15 and the position of the outer surface of fluid separation element 9, for example, as shown in FIG. 12E, a ring-like groove 91 may be formed on the side surface of anti-telescoping plate 90 and a seal member 92 composed of, for example, an elastomer, may be fitted into the groove 91. Feed water seal member 26 provided on the end portion of wrapping material 8 of downstream side fluid separation element 9 may be brought into contact with the seal member 92. In such structures, the sealing ability on the radially outer portion of the anti-telescoping plate may be further improved.

Figure 13A:
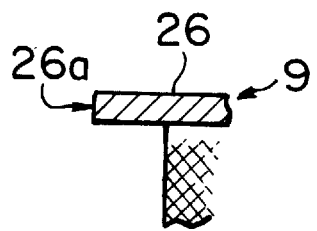
FIGS. 13A–13C are partial vertical sectional views of fluid separation elements showing structures of feed water seal members according to still further embodiments of the present invention.
Figure 13B:
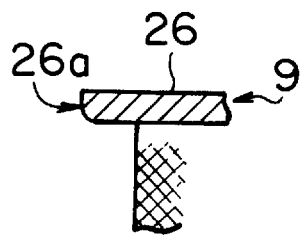
Figure 13C:
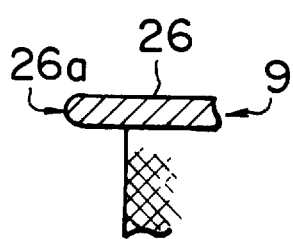

As the shape of the tip of feed water seal member 26 provided on the end portion of wrapping material 8 of fluid separation element 9, various shapes may be employed. For example, a flat tip 26a as shown in FIG. 13A, a tip 26b formed with a round or a chamfer on one corner as shown in FIG. 13B, or a round tip 26c as shown in FIG. 13C, may be employed.

Figure 14:
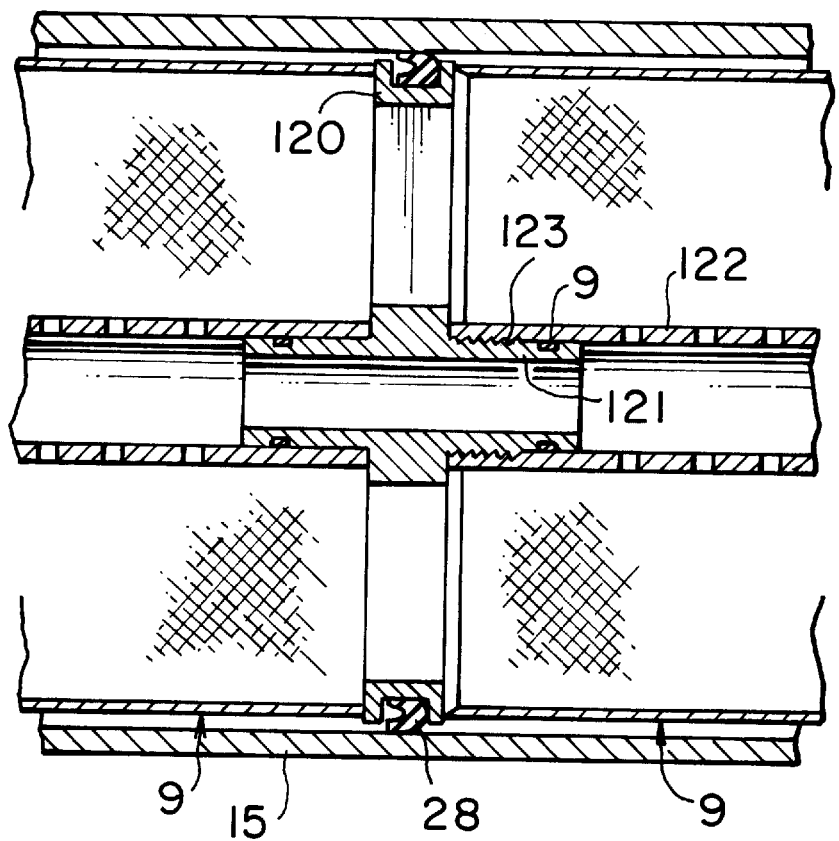
FIG. 14 is a partial vertical sectional view of a fluid separation membrane module showing a connection structure of an anti-telescoping plate and a permeate collection tube according to a still further embodiment of the present invention.

Although joint tube portion 14 of anti-telescoping plate 10 is inserted into permeate collection tube 3 of membrane unit 7 as aforementioned, both tubes may be connected by a screw structure. For example, as shown in FIG. 14, screws are defined on the periphery of joint tube portion 121 of anti-telescoping plate 120 and the inner surface of permeate collection tube 122, respectively, and both tubes are connected at a screw portion 123. In this structure, by the screw connection, the sealing ability between feed water seal member 26 provided on the end portion of wrapping material 8 and anti-telescoping plate 120 is increased, thereby preventing feed water from leaking into a gap between fluid separation element 9 and pressure vessel 15.

Figure 15:
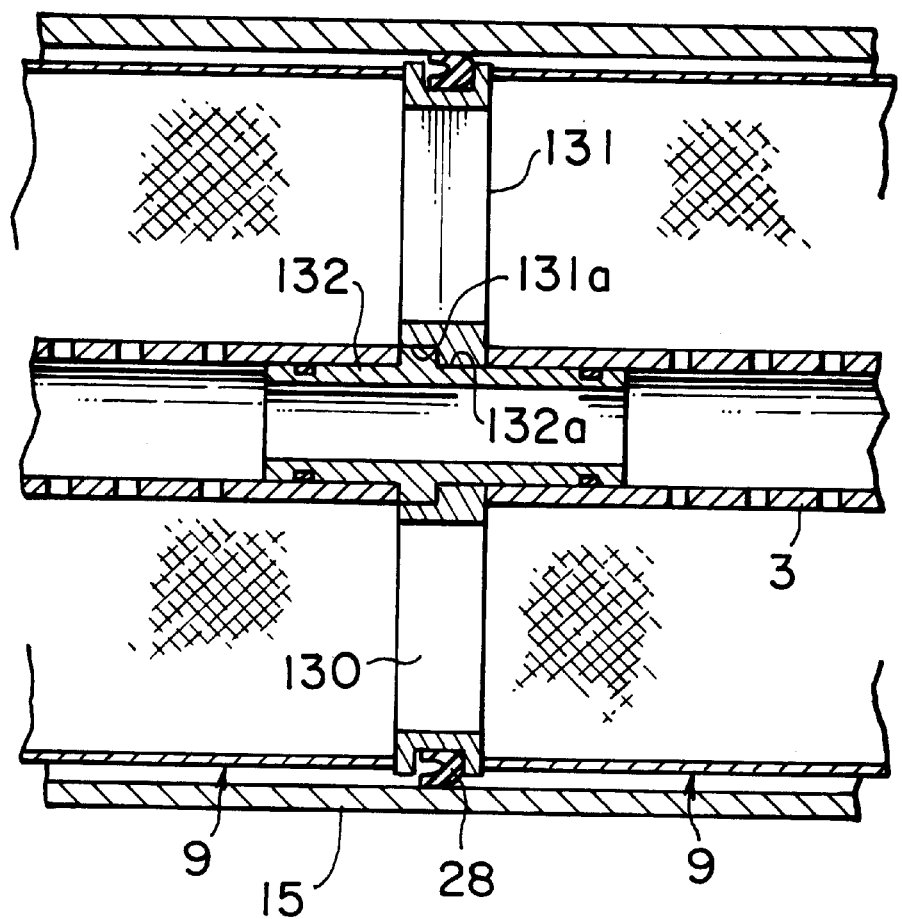
FIG. 15 is a partial vertical sectional view of a fluid separation membrane module showing a structure of an anti-telescoping plate according to a still further embodiment of the present invention.

Although the above-described embodiments show an anti-telescoping plate integrally formed including a joint tube portion, the joint tube portion may be formed as a separate member. For example, as shown in FIG. 15, disc portion 131 and joint tube portion 132 of anti-telescoping plate 130 are formed as members separate from each other, and both members are assembled into the anti-telescoping plate 130. In this structure, stepped portion 131a formed on the inner surface of disc portion 131 and stepped portion 132a formed on the periphery of joint tube portion 132 are engaged with each other in the axial direction receiving a thrust load to form anti-telescoping plate 130.

Figure 16:
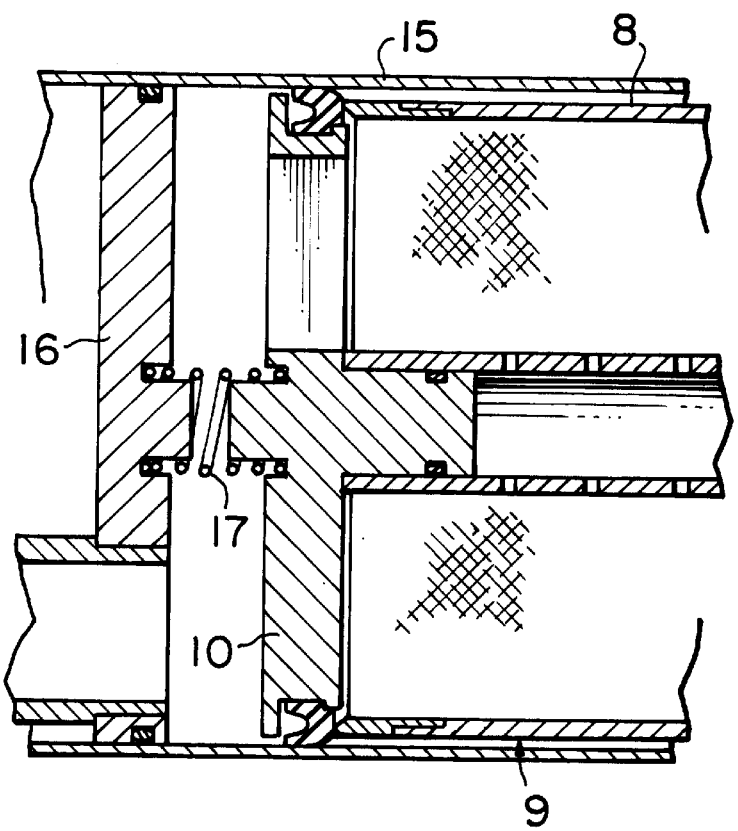
FIG. 16 is a partial vertical sectional view of a fluid separation membrane module showing a structure of the end portion of the module according to a still further embodiment of the present invention.
Figure 17:
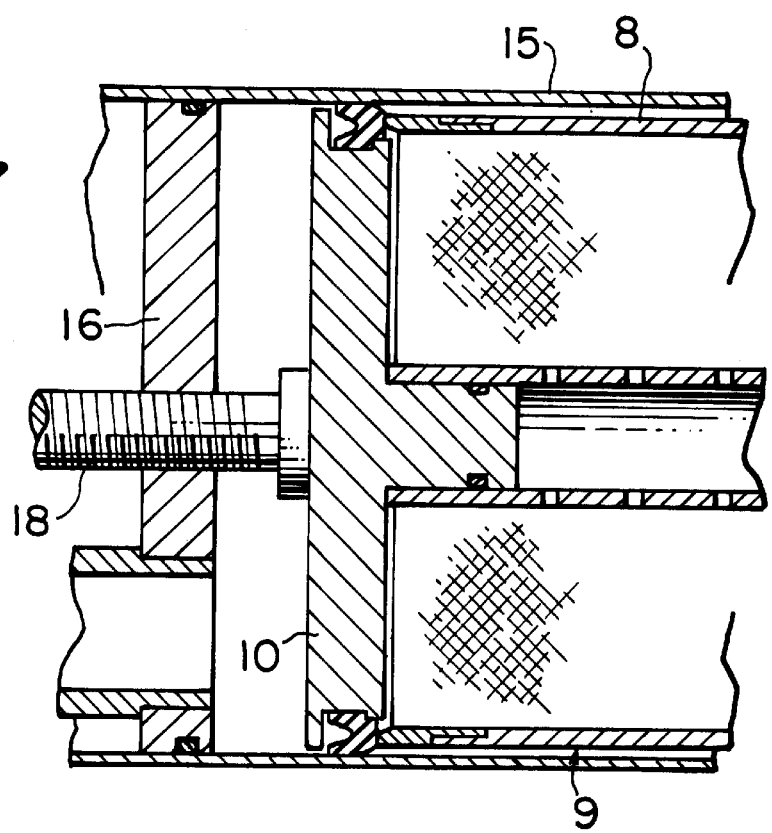
FIG. 17 is a partial vertical sectional view of a fluid separation membrane module showing another structure of the end portion of the module according to a still further embodiment of the present invention.

In the fluid separation membrane module according to the present invention, preferably a pressing member is provided between a lid of a pressure vessel and an anti-telescoping plate of a fluid separation element assembly located at a most upstream position, in order to sufficiently press a most upstream positioned anti-telescoping plate to the fluid separation element, thereby preventing feed water from leaking a gap between the pressure vessel and the fluid separation element through a gap between the anti-telescoping plate and the fluid separation element. Such a pressing member, for example, as shown in FIG. 16, may be formed by a structure wherein an urging member such as a metal spring 17 is interposed between anti-telescoping plate 10 and lid 16 of pressure vessel 15. Alternatively, as shown in FIG. 17, an adjusting bolt 18 may be provided to lid 16 of pressure vessel 15.

Figure 18:
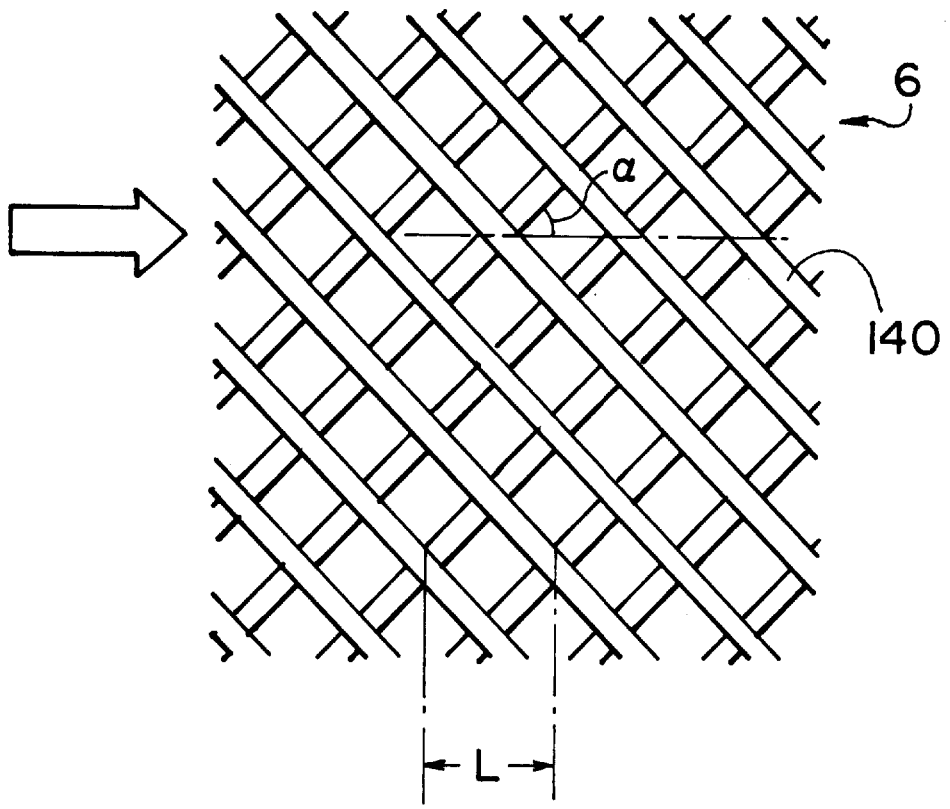
FIG. 18 is a partial plan view of a feed carrier material according to an embodiment of the present invention.

In the fluid separation element assembly according to the present invention, feed carrier material 6 preferably has a high performance for making the flow of feed water turbulent in order to suppress the concentration polarization small. Preferably a net having meshes each shaped as a rhombus is used in order to make the flow of feed water turbulent on the surface of the separation membrane. The net is preferably disposed so that the longer axis of the rhombus is directed in the flow direction of feed water, and the angle of a side of the rhombus is preferably in the range of ±15 to ±45 degrees relative to the flow direction of feed water. In the present invention, the "long axis" means a longer axis among the axes formed between the confronting corner points of a rhombic mesh, and the "angle of a side of the rhombus relative to the flow direction of feed water" means, as shown in FIG. 18, an angle a defined by the flow direction of feed water shown by an arrow and a mesh leg 140 forming the mesh. More preferably, the angle is in the range of ±15 to ±40 degrees. If this angle is smaller than 15 degrees, the turbulence performance for feed water rapidly decreases and the concentration near the surface of the separation membrane increases, and the concentration polarization becomes greater, the separation ability deteriorates and the quality of the treated water deteriorates.

In order to prevent such a condition, further preferably the angle of the mesh leg is in the range of ±20 to ±35 degrees relative to the flow direction of feed water. In a fluid separation membrane module having a plurality of fluid separation elements contained in a pressure vessel wherein the angle of the mesh leg of the feed carrier material is set within the above-described adequate range, because a reduction of the effective pressure operating on the fluid separation elements can be appropriately prevented, desired quality and amount of the treated water can be maintained without increasing the driving pressure. As a result, the power and running cost for the water treatment may be reduced. Also in the apparatus for the water treatment, because a high pressure pump and a high pressure resistant pipe are not required, the cost for the apparatus would be greatly decreased.

The thickness of the net is preferably 0.9 mm or less, more preferably 0.8 mm or less, in order to prevent a reduction of the area of the separation membrane and to obtain a sufficiently large amount of treated water. On the other hand, the thickness of the net is preferably 0.5 mm or more, more preferably 0.6 mm or more, in order to prevent remarkable increase of flow resistance and pressure loss due to a narrow passage. Further, the length L of the longer axis of the rhombic mesh shown in FIG. 18 is preferably in the range of 3 to 8 mm. By setting this length 3 mm or more, the density of net intersections per unit area may be suppressed small to prevent increase of flow resistance, thereby preventing increase of pressure loss. By setting the length 8 mm or less, a drift of the flow of feed water may be prevented, and the degrees of reduction of the separation abilities on an easily flowable portion and a hardly flowable portion may be prevented from being greatly differed. The length L of the longer axis is more preferably in the range of 3.3 to 7 mm, further more preferably in the range of 3.5 to 6 mm. The material of the net is preferably a polypropylene, a polyethylene, a nylon, a polyester, etc.

Further, in the fluid separation element assembly according to the present invention, the resistance in the passage formed by permeate carrier material 5 is preferably suppressed as low as possible, in order to further increase the separation performance of the separation membrane. To decrease the resistance of the passage, the opening ratio in the cross section of the carrier material is required to be great. Although the permeate carrier material is desired to be thinner in order to increase the charge density of the separation membrane in the membrane unit, this requirement is contrary to the requirement for decreasing the resistance of the passage, and in practice, the thickness of the permeate carrier material is designed to be an optimum value, from the viewpoint of the balance of the affections due to the respective requirements.

Figure 19:
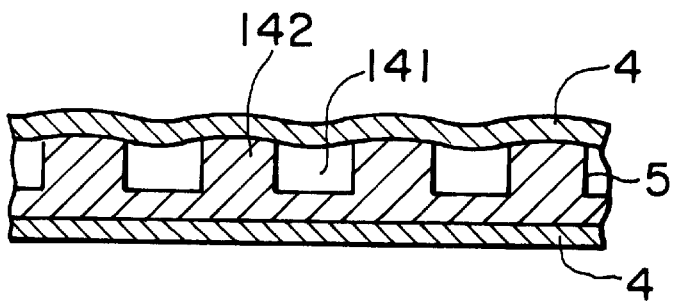
FIG. 19 is a partial sectional view of a permeate carrier material according to an embodiment of the present invention.
Figure 20:
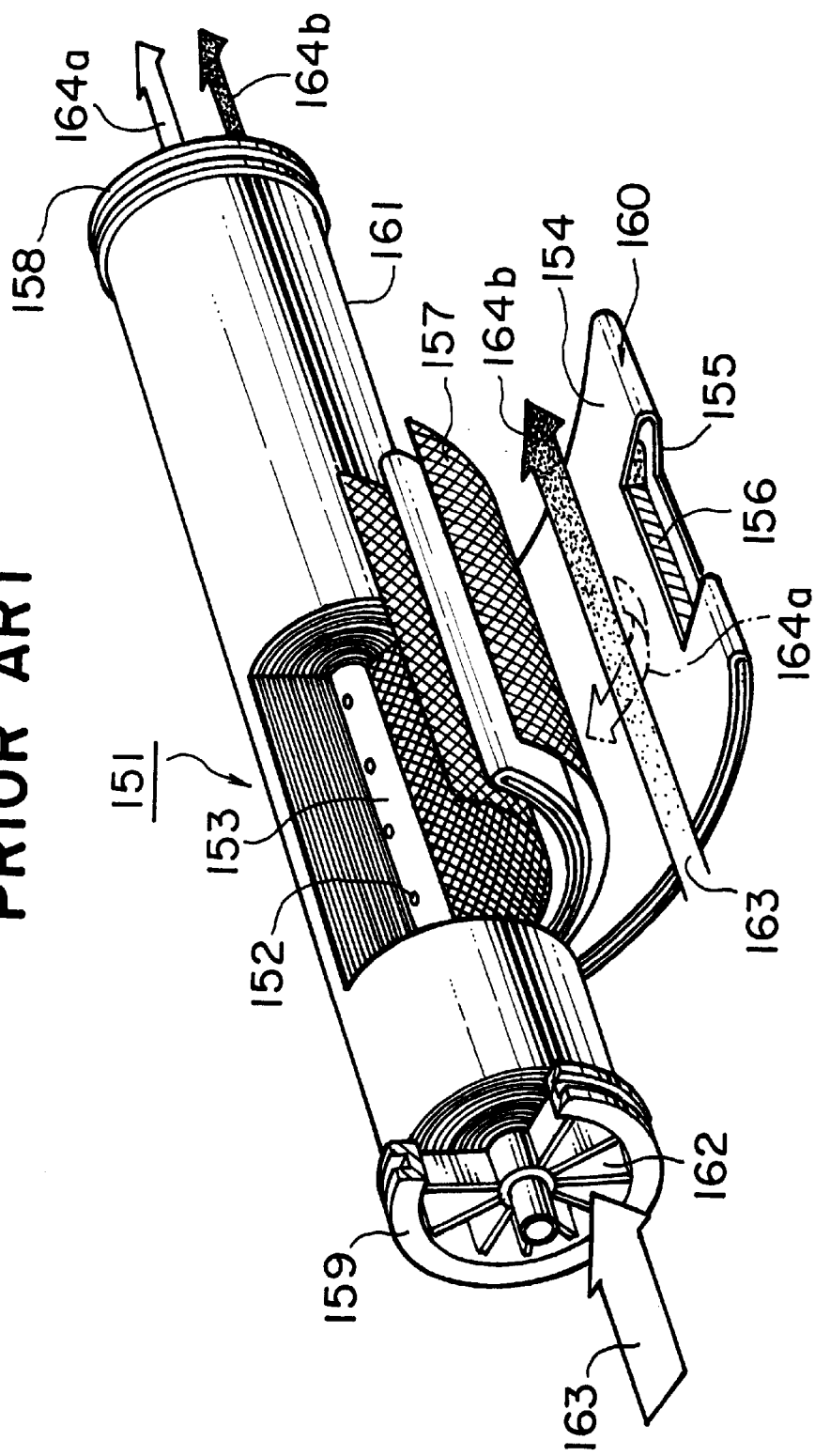
FIG. 20 is a perspective view of a conventional fluid separation element assembly.
Figure 21:
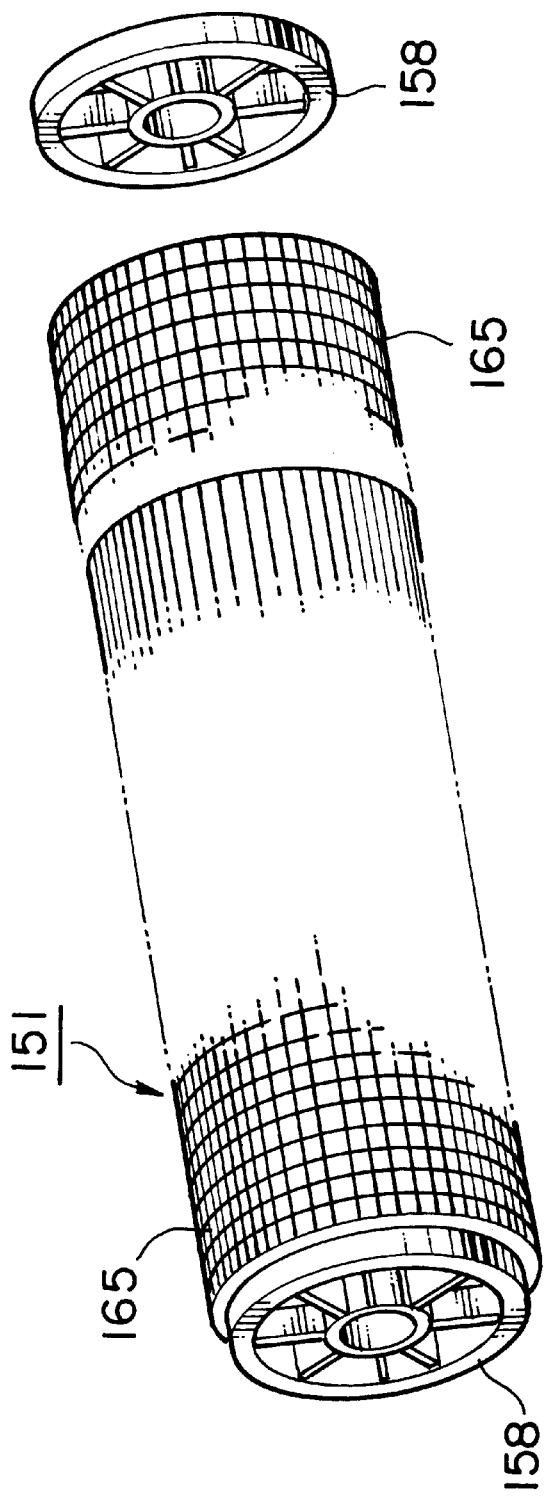
FIG. 21 is a perspective view of another conventional fluid separation element assembly.
Figure 22:
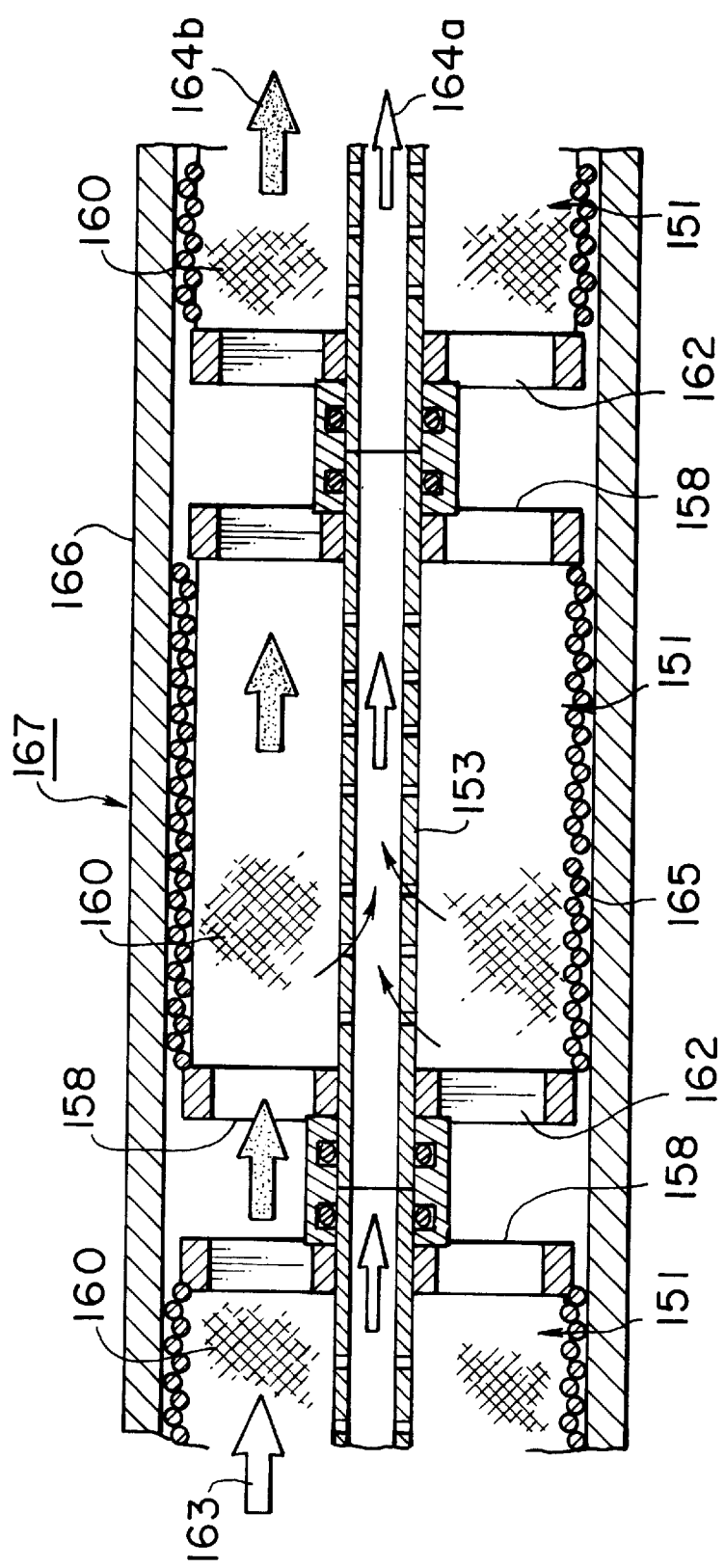
FIG. 22 is a partial vertical sectional view of a fluid separation membrane module using the fluid separation element assemblies shown in FIG. 21.

From such requirements, a net has been used as the permeate carrier material even in a conventional spiral type fluid separation element using a separation membrane. A typical one is a material prepared by hardening a tricot knitted with polyester fibers at a double dembigh structure by impregnating a resin into it or heatbonding itself, or a material prepared by further calendering the tricot to flatten the surface. For example, as shown in FIG. 19, permeate carrier material 5 is used in a condition where grooves 141 of the material 5 forming the permeated water passage are directed in a direction perpendicular to the axis of permeate collection tube 3. The thickness of permeate carrier material 5 is preferably in the range of 0.2 to 0.4 mm. In permeate carrier material 5 shown in FIG. 19, projections 142 forming grooves 141 provided as the permeated water passage and supporting separation membrane 4 are formed on the surface of the permeate carrier material 5.

The function required to wrapping material 8 is to maintain the formation of cylindrical fluid separation element 9. It is required to cover the entire periphery of membrane unit 7 with wrapping material 8 in order to flow feed water 20 uniformly on the surface of the separation membrane. Further, because fluid separation element 9 is structured to be applied with an inner pressure during use, it is required to prevent an easy expansion or breakage of the element 9. From such requirements, wrapping material 8 is typically formed by using a filament winding process, wherein a resin such as an epoxy is impregnated into glass fibers or polyester filaments, the resin impregnated material is wound around membrane unit 7, and thereafter, the resin is cured.

Although several embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A fluid separation element assembly comprising:
    a fluid separation element having a membrane unit and a
        wrapping material formed around said membrane unit, said membrane unit being formed of a separation membrane, a permeate carrier material and a feed carrier material which are spirally wound around a permeate collection tube, a plurality of said fluid separation elements including said separation membrane, said carrier material and said feed carrier material being contained in a pressure vessel;

an anti-telescoping plate attached to at least one end of one of said fluid separation elements with freedom to be detached; and feed water seal means sealingly connected across a gap between said fluid separation element and said anti-telescoping plate, for preventing fluid feed from leaking through said gap.

2. The fluid separation element assembly according to claim 1, wherein said feed water seal means comprises a ring member provided on at least one end of said wrapping material and projecting in the axial direction of said fluid separation element.

3. The fluid separation element assembly according to claim 2, wherein said ring member is composed of a material having a flexural strength of 50 MPa or more.

4. The fluid separation element assembly according to claim 2, wherein said ring member is formed as a divided ring having seams at positions in the circumferential direction of said ring member.

5. The fluid separation element assembly according to claim 2, wherein said ring member is positioned in contact with said anti-telescoping plate.

6. The fluid separation element assembly according to claim 2, wherein a seal ring is attached at a periphery of said anti-telescoping plate.

7. The fluid separation element assembly according to claim 6, wherein said seal ring is attached in a groove formed on said periphery of said anti-telescoping plate.

8. The fluid separation element assembly according to claim 1, wherein a ring portion projecting toward a fluid separation element side is provided on a radially outer portion of said anti-telescoping plate.

9. The fluid separation element assembly according to claim 8, wherein said feed water seal means is provided between said projected ring portion and a periphery of said fluid separation element.

10. The fluid separation element assembly according to claim 8, wherein said feed water seal means covers an area extending from a periphery of said projected ring portion to a periphery of said fluid separation element.

11. The fluid separation element assembly according to claim 8, wherein a seal ring is attached on a periphery of said anti-telescoping plate.

12. The fluid separation element assembly according to claim 11, wherein said seal ring is attached in a groove formed on said periphery of said anti-telescoping plate.

13. The fluid separation element assembly according to claim 1, wherein said anti-telescoping plate comprises a disc portion having a feed water passage and a joint tube portion provided in a central portion of said disc portion and having a permeated water passage.

14. The fluid separation element assembly according to claim 13, wherein said anti-telescoping plate further comprises a member preventing feed water from entering into said permeate collection tube.

15. The fluid separation element assembly according to claim 14, wherein said disc portion and said joint tube portion are integrally formed.

16. The fluid separation element assembly according to claim 14, wherein said disc portion and said joint tube portion are formed separately from each other.

17. The fluid separation element assembly according to claim 14, wherein said joint tube portion is inserted into said permeate collection tube.

18. The fluid separation element assembly according to claim 1, wherein said feed carrier material comprises a net having meshes each shaped as a rhombus, said net is disposed so that a longer axis of said rhombus is directed in the flow direction of said feed water, the angle of a side of said rhombus is in a range of ±15 to ±45 degrees relative to the flow direction of said feed water, the thickness of said net is in a range of 0.5 to 0.9 mm, and the length of said longer axis of said rhombus is in a range of 3 to 8 mm.

19. A fluid separation membrane module containing a plurality of fluid separation element assemblies according to claim 1 in a pressure vessel.

20. The fluid separation membrane module according to claim 19, wherein said pressure vessel has a lid at its each axial end, and between said lid and an anti-telescoping plate of a fluid separation element assembly located at a most upstream position in the flow direction of feed water, means for pressing the anti-telescoping plate in the axial direction of said pressure vessel is provided.

21. A fluid separation element assembly comprising:

a fluid separation element having a membrane unit and a wrapping material formed around said membrane unit, said membrane unit being formed by a separation membrane, a permeate carrier material and a feed carrier material which are spirally wound around a permeate collection tube;

an anti-telescoping plate attached to at least one end of said fluid separation element at a condition free to be detached; and a seal ring attached on a periphery of said anti-telescoping plate for sealing a gap between said periphery of said anti-telescoping plate and an inner surface of a pressure vessel containing said fluid separation element and said anti-telescoping plate.

22. The fluid separation element assembly according to claim 21, wherein said seal ring is attached in a groove formed on said periphery of said anti-telescoping plate.

23. The fluid separation element assembly according to claim 22, wherein a side wall located at a position upstream of said groove in the flow direction of feed water is taller than a side wall located at a position downstream of said groove in the flow direction of said feed water, and said seal ring attached in said groove comes into contact with said fluid separation element.

24. A fluid separation membrane module containing a plurality of fluid separation element assemblies according to claim 21 in a pressure vessel.

25. The fluid separation membrane module according to claim 24, wherein said pressure vessel has a lid at its each axial end, and between said lid and an anti-telescoping plate of a fluid separation element assembly located at a most upstream position in the flow direction of feed water, means for pressing the anti-telescoping plate in the axial direction of said pressure vessel is provided.

26. A fluid separation element assembly comprising:

a fluid separation element having a membrane unit and a wrapping material formed around said membrane unit, said membrane unit being formed of a separation membrane, a permeate carrier material and a feed carrier material which are spirally wound around a permeate collection tube;

an anti-telescoping plate attached to at least one end of said fluid separation element with freedom to be detached; and feed fluid seal means sealingly connected across a gap between said fluid separation element and said anti-telescoping plate, for preventing feed fluid from leaking through said gap, wherein said feed fluid seal means comprises a ring member provided on at least one end of said wrapping material, and projecting in the axial direction of said fluid separation element, wherein said ring member is composed of a material having a flexural strength of 50 Mpa or more, and wherein said ring member is formed as a divided ring having seams at positions in the circumferential direction of said ring member.

27. A fluid separation element having a membrane unit and a wrapping material formed around said membrane unit, said membrane unit being formed by a separation membrane, a permeate carrier material and a feed water carrier material which are spirally wound around a permeate collection tube;

an anti-telescoping plate attached to at least one end of said fluid separation element at a condition free to be detached; and a seal ring attached on a periphery of said anti-telescoping plate for sealing a gap between said periphery of said anti-telescoping plate and an inner surface of a pressure vessel containing said fluid separation element and said anti-telescoping plate, wherein said seal ring is attached in a groove formed on said periphery of said anti-telescoping plate, wherein a side wall located at a position upstream of said groove in the flow direction of feed water is taller than a side wall located at a position downstream of said groove in the flow direction of said feed water, and said seal ring attached in said groove comes into contact with said fluid separation element.

28. A fluid separation element assembly comprising a fluid separation element having a membrane unit and a wrapping material formed around said membrane unit, said membrane unit being formed of a separation membrane, a permeate carrier material and a feed carrier material which are spirally wound around a permeate collection tube;

an anti-telescoping plate attached to at least one end of said fluid separation element with freedom to be detached; and feed water seal means sealingly connected across a gap between said fluid separation element and said anti-telescoping plate, for preventing fluid feed from leaking through said gap, wherein said seal means is a seal ring and is attached at a periphery of said anti-telescoping plate, and wherein said seal ring is attached in a groove formed on said periphery of said anti-telescoping plate, wherein a side wall located at a position upstream of said groove in the flow direction of said feed water is taller than a side wall located at a position downstream of said groove in the flow direction of said feed water, and said seal ring attached in said groove comes into contact with said fluid separation element.

29. The fluid separation element assembly according to claim 28, wherein a seal ring attached in said groove comes into contact with a ring member provided on said wrapping material.

* * * * *